Nov. 21, 1933.  C. W. BALDWIN  1,935,828
STORAGE BATTERY CARRIER
Filed Sept. 30, 1932

Charles W. Baldwin,
INVENTOR.

BY J. Stanley Burch
ATTORNEY.

Patented Nov. 21, 1933

1,935,828

UNITED STATES PATENT OFFICE 1,935,828

STORAGE BATTERY CARRIER

Charles W. Baldwin, Elsinore, Calif.

Application September 30, 1932
Serial No. 635,667

2 Claims. (Cl. 294—119)

This invention relates to improvements in storage battery carriers, and the object of the invention is to provide a device of this character which may be very conveniently employed for lifting and carrying a storage battery, as well as quickly applied to or removed from the battery.

Storage batteries are ordinarily composed of calls arranged within a wooden case, and these cases often rot so that the handles thereof are pulled off, necessitating carrying of the battery in the hands. This results in injurious effects to the hands and clothes, and the storage battery is very awkward to handle in this manner. Accordingly, the present invention aims to provide a device adapted to engage the straps which serially electrically connect the terminals of the battery cells, whereby the battery may be conveniently lifted and carried about.

Another object of the invention is to provide an improved construction of storage battery carrier which, in use, will not cause short circuiting of the battery cells.

The invention consists in the novel form, combination and arrangement of parts hereinafter more fully described, shown in the accompanying drawing and claimed.

Figure 1:
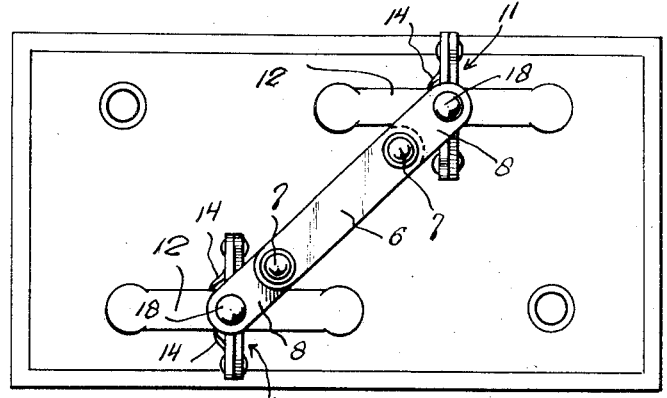
Figure 1 is a top plan view of a storage battery carrier operatively engaged with the cell terminal connecting straps of a storage battery.
Figure 2:
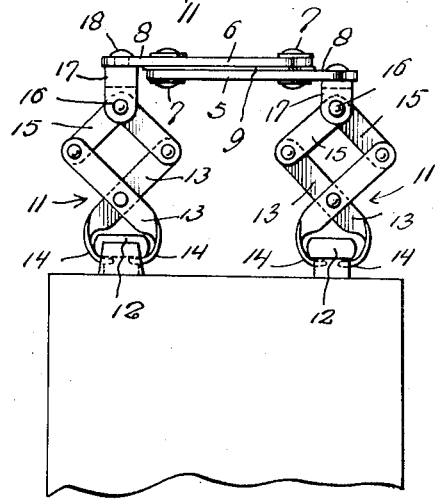
Figure 2 is an elevational view thereof.
Figure 3:
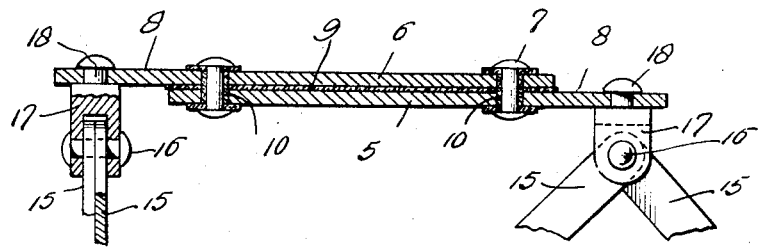
Figure 3 is a fragmentary view of the carrier showing the handle of the latter in central longitudinal section, together with portions of the coacting gripping elements carried by each end of the handle for engagement with the cell terminal connecting straps of the battery.

Referring in detail to the drawing, the present invention includes an elongated handle composed of superposed flat metal bars 5 and 6 riveted tightly together as at 7 and each having a projecting outer end portion 8, suitable insulation 9 being interposed between the contiguous surfaces of the bars 5 and 6 to electrically insulate them from each other, and suitable insulating washers and sleeves being provided respectively under the heads and about the shanks of the rivet 7 to insulate them from the bars 5 and 6.

Attached to opposite projecting ends 8 of the handle thus constructed, are similar coacting gripping elements 11 which engage under and grip the cell terminal connecting straps 12 of the battery in proportion to the strain applied thereto.

As shown, these gripping elements consist of a pair of pivotally connected crossed levers 13, each having at its lower end a gripping jaw 14. The upper ends of the levers are connected by pivoted links 15 to a common pivot 16 carried by the lower end of a depending member 17 swivelled at its upper end as at 18 to the end of the handle, upon a vertical axis. It will be seen that the swivelled members 17 will permit positioning of the gripping elements in engagement with the straps 12 which are located adjacent opposite sides of the battery, with the handle of the carrier extending obliquely of the battery from one strap 12 to the other.

By placing the device upon the battery and allowing the handle of the carrier to lower, the jaws of the gripping elements will be spread so as to be conveniently positioned at opposite sides of the battery straps 12. Upon then gripping the handle of the carrier and lifting upwardly thereon, the jaws of levers 13 will be swung into gripping engagement with and beneath the straps 12 so that the battery may be conveniently lifted and carried. As the bars 5 and 6 of the carrier handle are insulated from each other, short circuiting of the battery cells is prevented. The device may be very readily and cheaply produced, and will be found exceedingly durable and efficient in use.

What I claim as new is:

1. A battery carrier comprising a handle formed of flat bars having their inner ends superposed and rigidly connected together and insulated from each other, each of said bars having a projecting outer end at opposite ends of the handle, and coacting gripping elements carried by and depending from the projecting outer end of each bar of the handle.

2. A battery carrier comprising a handle formed of flat bars having their inner ends superposed and rigidly connected together and insulated from each other, each of said bars having a projecting outer end at opposite ends of the handle, coacting gripping elements carried by and depending from the projecting outer end of each bar of the handle, and members swivelled upon vertical axes to and depending from the projecting ends of the handle bars, said gripping elements being suspended from said swivelled members for being freely arranged in angular relation to the handle.

CHARLES W. BALDWIN.